US009666878B2

(12) United States Patent
Tsai et al.

(10) Patent No.: US 9,666,878 B2
(45) Date of Patent: *May 30, 2017

(54) METHOD FOR FABRICATING CATALYTIC 3D NETWORK MATERIAL

(71) Applicant: Taiwan Carbon Nanotube Technology Corporation, Miaoli County (TW)

(72) Inventors: Chun-Hsien Tsai, Miaoli County (TW); Ting-Chuan Lee, Miaoli County (TW); Chun-Jung Tsai, Miaoli County (TW); Ching-Tung Hsu, Miaoli County (TW); Chia-Hung Li, Miaoli County (TW); Jui-Yu Jao, Miaoli County (TW); Wen-Hui Liu, Miaoli County (TW); Ya-Han Wu, Miaoli County (TW)

(73) Assignee: TAIWAN CARBON NANO TECHNOLOGY CORPORATION, Zhunan Township, Miaoli County (TW)

( * ) Notice: Subject to any disclaimer, the term of this patent is extended or adjusted under 35 U.S.C. 154(b) by 5 days.

This patent is subject to a terminal disclaimer.

(21) Appl. No.: 14/801,438

(22) Filed: Jul. 16, 2015

(65) Prior Publication Data
US 2016/0329572 A1    Nov. 10, 2016

(30) Foreign Application Priority Data

May 8, 2015   (TW) .............................. 104114680 A

(51) Int. Cl.
*B01J 27/24*    (2006.01)
*B01J 37/00*    (2006.01)
(Continued)

(52) U.S. Cl.
CPC ..................................... *H01M 4/96* (2013.01)

(58) Field of Classification Search
CPC ........ B01J 21/185; B01J 27/24; B01J 35/002; B01J 37/00; B01J 37/0236; B01J 37/04;
(Continued)

(56) References Cited

U.S. PATENT DOCUMENTS 4,618,491 A * 10/1986 Kanematu ............ A61K 8/0212
514/781
8,221,937 B2    7/2012 Dai
(Continued)

FOREIGN PATENT DOCUMENTS

TW    201418286    *    5/2014    ............ C08B 15/04

*Primary Examiner* — Patricia L Hailey
(74) *Attorney, Agent, or Firm* — Muncy, Geissler, Olds & Lowe, P.C.

(57) ABSTRACT

A method for fabricating a catalytic 3-dimensional network material comprises steps: mixing an aqueous solvent with a nitrogen-containing carbon material whose surface is doped with nitrogen atoms to form a first dispersion liquid, and mixing the first dispersion liquid with ammonium carboxymethyl cellulose to form a first gel; undertaking a freeze-drying process of the first gel to remove water from the first gel to form a first product; and undertaking a low-temperature heating process of the first product at a temperature of 50-380° C. to cure the first product into a 3D network material doped with nitrogen atoms. The catalytic 3D network material of the present invention has a very high specific surface area to increase the catalytic efficiency.

18 Claims, 3 Drawing Sheets

(51) Int. Cl.
  *B01J 37/04* (2006.01)
  *B01J 37/08* (2006.01)
  *H01M 4/96* (2006.01)

(58) Field of Classification Search
  CPC .... B01J 37/08; B01J 13/0052; B01J 13/0091; H01M 4/96
  USPC .......... 502/180, 200; 516/98, 106; 977/748, 977/749
  See application file for complete search history.

(56) References Cited

U.S. PATENT DOCUMENTS

| | | | |
|---|---|---|---|
| 2005/0229744 A1* | 10/2005 | Kijima | B22F 1/0025 75/255 |
| 2010/0092371 A1* | 4/2010 | Backov | B01J 13/0091 423/460 |
| 2012/0255607 A1* | 10/2012 | Roy-Mayhew | H01G 9/2031 136/256 |
| 2015/0148433 A1* | 5/2015 | Tsai | B01J 13/0065 516/106 |

\* cited by examiner

METHOD FOR FABRICATING CATALYTIC 3D NETWORK MATERIAL

FIELD OF THE INVENTION

The present invention relates to method for fabricating a catalytic material, particularly to a method for fabricating a catalytic 3D network material.

BACKGROUND OF THE INVENTION

The platinum catalyst features low reactivity (hard to participate in reaction) and high catalytic efficiency. The platinum catalyst has been extensively in many fields, especially the field of fuel cells. In principle, a fuel cell converts chemical energy into electric energy. The high catalytic efficiency of the platinum catalyst can promote the energy conversion efficiency of fuel cells and the productivity of electricity. However, the platinum catalyst is normally made from precious metals and very expensive. Thus, a carbon material doped with nitrogen atoms was developed to replace the platinum catalyst.

As to carbon materials doped with nitrogen atoms, a U.S. Pat. No. 8,221,937 disclosed a "Carbon Nanotube Catalyst Applied to Fuel Cells", wherein the cathode of a fuel cell comprises a cathode, a connection layer and a catalyst layer; the connection layer is connected with the cathode and includes a conductive polymeric material and a plurality first carbon nanotubes arranged non-parallel; the catalyst layer is connected with the connection layer and includes a plurality of second carbon nanotubes doped with nitrogen atoms and arranged vertically. The second carbon nanotubes doped with nitrogen atoms has a catalytic effect and can promote the power generation efficiency of the fuel cell.

However, carbon nanotubes are likely to agglomerate into carbon nanotube bundles, which have smaller effective area and lower catalytic ability.

SUMMARY OF THE INVENTION

The primary objective of the present invention is to solve the problem that the conventional catalytic nitrogen atom-doped carbon nanotubes have smaller surface area and lower catalytic efficiency.

To achieve the abovementioned objective, the present invention proposes a method for fabricating a catalytic 3D network material, which comprises Step 1A: mixing an aqueous solvent with a nitrogen-containing carbon material whose surface is doped with nitrogen atoms to form a first dispersion liquid, and mixing the first dispersion liquid with ammonium carboxymethyl cellulose to form a first gel;

Step 2A: undertaking a freeze-drying process of the first gel to remove water from the first gel to form a first product; and Step 3A: undertaking a low-temperature heating process of the first product at a temperature of 50-380° C. to cure the first product into a 3D network material doped with nitrogen atoms.

The present invention also proposes a method for fabricating a catalytic 3D network material, which comprises Step 1B: mixing an aqueous solvent with a carbon material to form a second dispersion liquid, and mixing the second dispersion liquid with ammonium carboxymethyl cellulose to form a second gel;

Step 2B: undertaking a freeze-drying process of the second gel to remove water from the second gel to form a second product;

Step 3B: undertaking a low-temperature heating process of the second product at a temperature of 50-380° C. to cure the second product into a third product; and Step 4B: placing the third product in a container filled with ammonium, and keeping the container at a temperature of 500-1000° C. to form a 3D network material doped with nitrogen atoms.

Thereby, the 3D network material of the present invention is mainly made from and a carbon material and doped with nitrogen atoms and has a catalytic function. As the product of the present invention has a 3D network structure, it has a very high specific surface area and a better catalytic effect.

DETAILED DESCRIPTION OF THE PREFERRED EMBODIMENTS

Figure 1A:
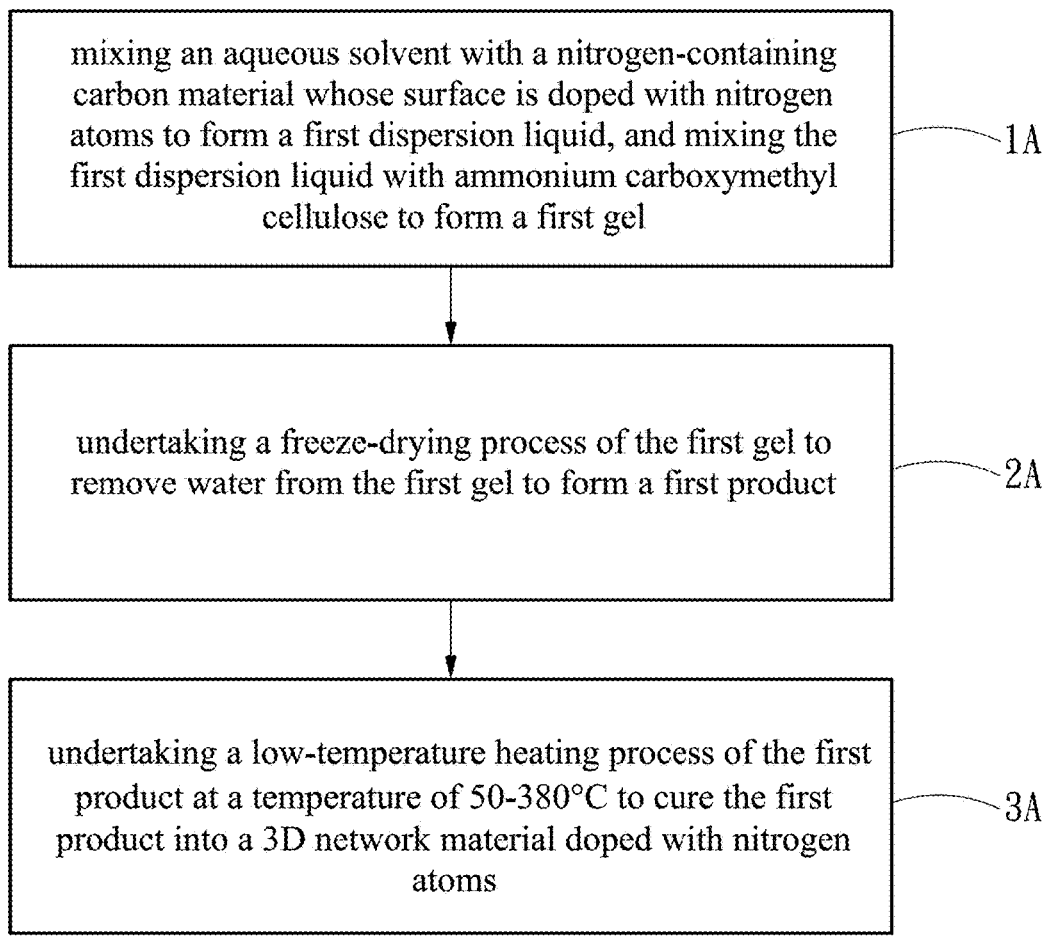
FIG. 1A is a flowchart of a method for fabricating a catalytic 3D network material according to a first embodiment of the present invention.
Figure 1B:
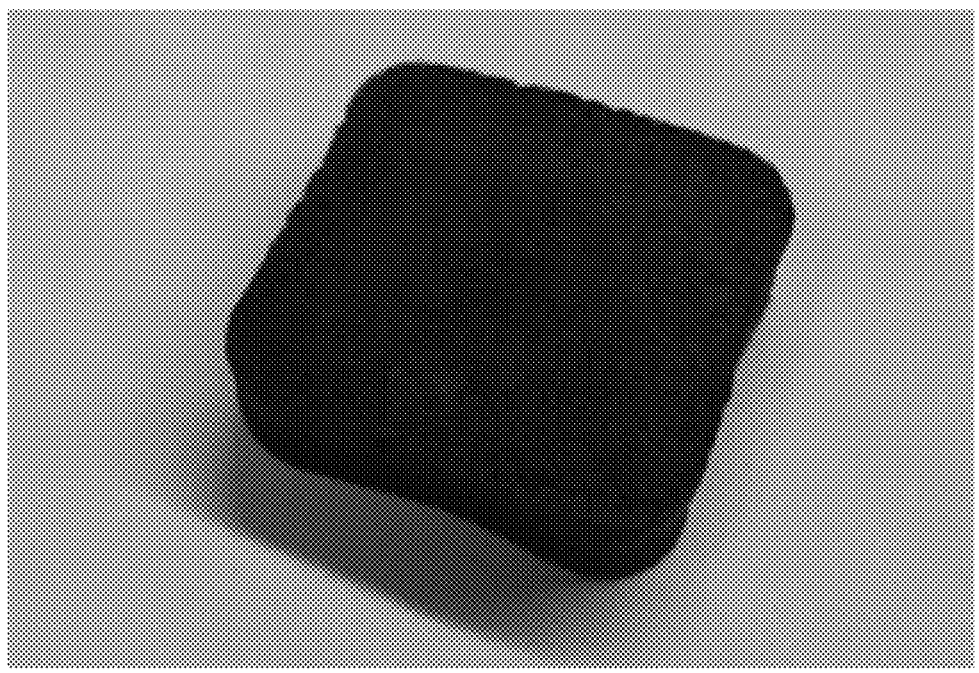
FIG. 1B is a photograph of a catalytic 3D network material fabricated according to the first embodiment of the present invention.

The technical contents of the present invention will be described in detail in cooperation with the drawings below. Refer to FIG. 1A and FIG. 1B respectively a flowchart of a method for fabricating a catalytic 3D network material according to a first embodiment of the present invention and a photograph of a catalytic 3D network material fabricated according to the first embodiment of the present invention. As shown in FIG. 1A, the method for fabricating a catalytic 3D network material comprises Steps 1A-3A.

In Step 1A, place a carbon material in a container filled with ammonium, wherein the carbon material is carbon nanotube, graphene, carbon nanoribbon, or a combination thereof; heat the container to a temperature of 500-1000° C. to decompose ammonium and release nitrogen atoms, whereby the nitrogen atoms will attach to the carbon material to form a nitrogen-containing carbon material; mixing an aqueous solvent with the nitrogen-containing carbon material whose surface is doped with nitrogen atoms to form a first dispersion liquid, wherein the weight ratio of the nitrogen-containing carbon material and the aqueous solvent ranges from 0.01:100 to 50:100; mixing the first dispersion liquid with ammonium carboxymethyl cellulose to form a first gel, wherein the weight ratio of the ammonium carboxymethyl cellulose and the first dispersion liquid ranges from 0.1:100 to 50:100.

In Step 2A, undertake a freeze-drying process of the first gel to sublime water and remove water from the first gel to form a first product, wherein the freeze-drying process is undertaken at a temperature ranging from 0 to −200° C.

In Step 3A, undertake a low-temperature heating process of the first product at a temperature of 50-380° C., preferably 80-350° C., for 1 minute to 10 hours to cure the first product into a 3D network material doped with nitrogen atoms, whose photograph is shown in FIG. 1B.

In Step 1A, a first surfactant may be added into the first gel. The first surfactant is sodium dodecyl sulfate (SDS) or sodium dodecyl benzene sulphonate (SDBS). In such a case, the weight ratio of the nitrogen-containing carbon material and the aqueous solvent ranges from 0.01:100 to 50:100; the weight ratio of the ammonium carboxymethyl cellulose and the aqueous solvent ranges from 0.1:100 to 80:100; the weight ratio of the first surfactant and the aqueous solvent ranges from 0.01:100 to 50:100. Besides, glycerol may be added into the first gel to enhance the mechanical strength of the 3D network material. The weight ratio of the glycerol and the ammonium carboxymethyl cellulose ranges from 0.01:1 to 5:1.

Figure 2:
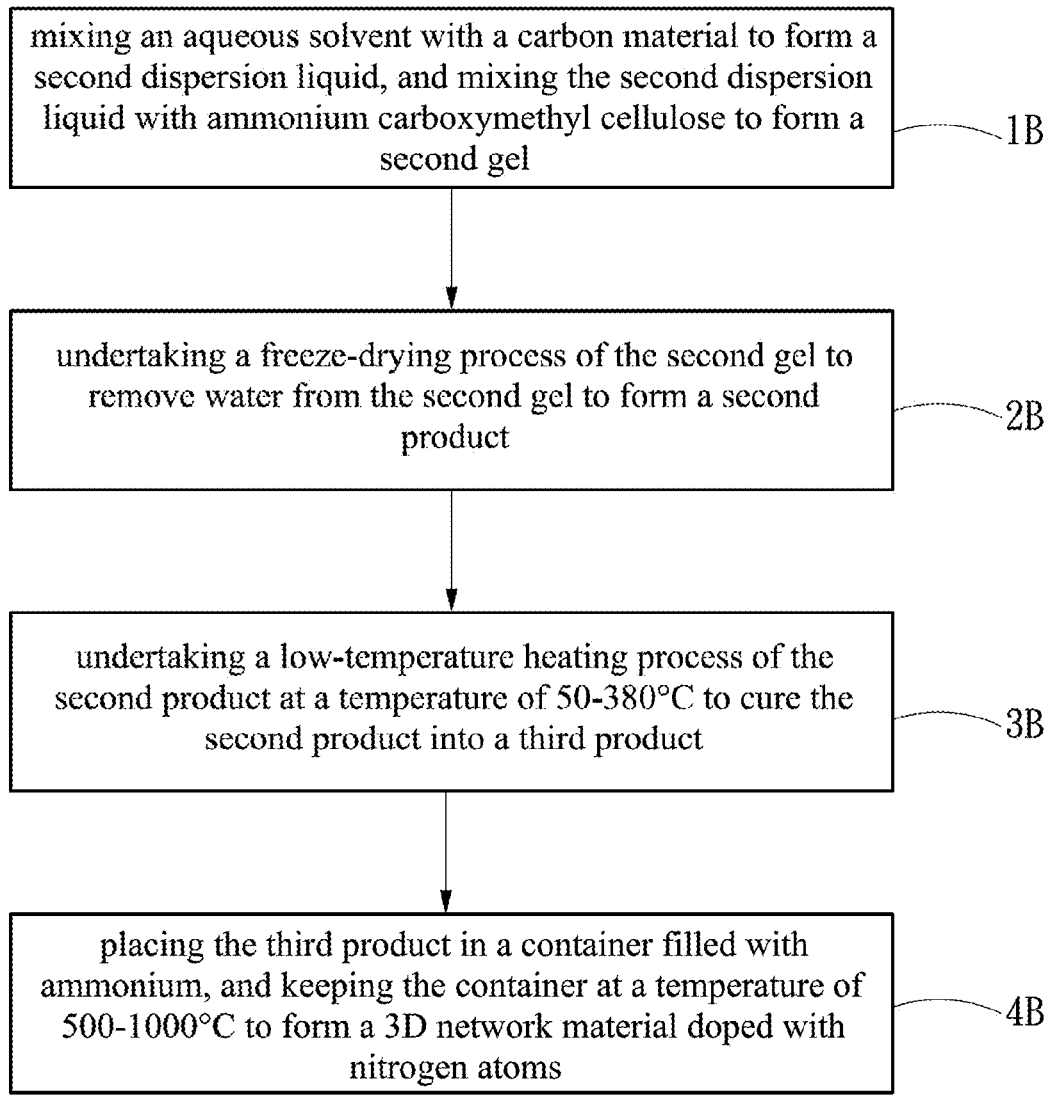
FIG. 2 is a flowchart of a method for fabricating a catalytic 3D network material according to a second embodiment of the present invention.

Refer to FIG. 2 a flowchart of a method for fabricating a catalytic 3D network material according to a second embodiment of the present invention. The second embodiment provides another method for fabricating a catalytic 3D network material. The second embodiment is different from the first embodiment in that the sequence of the step for attaching nitrogen atoms to the carbon material. In the second embodiment, the method of the present invention comprises Steps 1B-4B.

In Step 1B, mix a carbon material with an aqueous solvent to form a second dispersion liquid, wherein the carbon material is carbon nanotube, graphene, carbon nanoribbon, or a combination thereof; mix the second dispersion liquid with ammonium carboxymethyl cellulose to form a second gel, wherein the weight ratio of the carbon material and the aqueous solvent ranges from 0.01:100 to 50:100, and wherein the weight ratio of the ammonium carboxymethyl cellulose and the second dispersion liquid ranges from 0.1:100 to 100:100. The second gel can be alternatively obtained via the following steps: undertaking an acidifying process of a carbon material to obtain an acidified carbon material; mixing the acidified carbon material with an aqueous solvent to form a second dispersion liquid; and mixing the second dispersion liquid with ammonium carboxymethyl cellulose to form a second gel. In such a case, the weight ratio of the acidified carbon material and the aqueous solvent ranges from 0.01:100 to 50:100, and the weight ratio of the ammonium carboxymethyl cellulose and the aqueous solvent ranges from 0.1:100 to 100:100.

In Step 2B, undertake a freeze-drying process of the second gel to sublime water and remove water from the second gel to form a second product, wherein the freeze-drying process is undertaken at a temperature ranging from 0 to −200° C.

In Step 3B, undertake a low-temperature heating process of the second product at a temperature of 50-380° C., preferably 80-350° C., for 1 minute to 10 hours to cure the second product into a third product.

In Step 4B, place the third product in a container filled with ammonium, and keep the container at a temperature of 500-1000° C. to decompose the ammonium and release nitrogen atoms to let the nitrogen atoms attach to the carbon material to form a 3D network material doped with nitrogen atoms.

In Step 1B, a second surfactant may be added into the second gel. The second surfactant is sodium dodecyl sulfate (SDS) or sodium dodecyl benzene sulphonate (SDBS). In such a case, the weight ratio of the carbon material and the aqueous solvent ranges from 0.01:100 to 50:100; the weight ratio of the ammonium carboxymethyl cellulose and the aqueous solvent ranges from 0.1:100 to 100:100; the weight ratio of the second surfactant and the aqueous solvent ranges from 0.01:100 to 50:100. Besides, glycerol may be added into the second gel to enhance the mechanical strength of the 3D network material. The weight ratio of the glycerol and the ammonium carboxymethyl cellulose ranges from 0.01:1 to 5:1.

It should be particularly mentioned: in Steps 3B and 4B, as ammonium carboxymethyl cellulose will release ammonium gas in heating, the container will be full of ammonium gas spontaneously. Therefore, the 3D network material will be still doped with nitrogen atoms even though no additional ammonium gas is filled into the container. The porous structure of the 3D network material is too tiny to be filled with ordinary materials. However, the nanometer-scale carbon material can be filled into the porous structure to enhance the strength of the 3D network material in the present invention. Therefore, the 3D network material of the present invention has better mechanical properties. If the carbon material is carbon nanotube, graphene or carbon nanoribbon, the 3D network material will possess superior electric conductivity, weather resistance and corrosion resistance.

In conclusion, the present invention proposes a method for fabricating a catalytic 3D network material, which is mainly made from a carbon material and doped with nitrogen atoms. In the present invention, a freeze-drying process is used to make the carbon material doped with nitrogen atoms present a 3D network structure. Thereby, the catalytic 3D network material of the present invention has numerous open pores and a very high specific surface area. Thus, the catalytic 3D network material of the present invention has larger catalyzing area and better catalyzing effect.

What is claimed is:

1. A method for fabricating a catalytic 3-dimensional network material, comprising the steps of:
    Step 1A: placing a carbon material in a container filled with ammonium, heating the container to a temperature 500-1000° C. to decompose the ammonium gas and release nitrogen atoms, which attach to the carbon material to form a nitrogen-containing carbon material, mixing an aqueous solvent with the nitrogen-containing carbon material whose surface is doped with nitrogen atoms to form a first dispersion liquid, and mixing the first dispersion liquid with ammonium carboxymethyl cellulose to form a first gel;
    Step 2A: undertaking a freeze-drying process of the first gel to remove water from the first gel to form a first product; and
    Step 3A: undertaking a low-temperature heating process of the first product at a temperature of 50-380.degree. C. to cure the first product into a 3D network material doped with nitrogen atoms.

2. The method for fabricating a catalytic 3-dimensional network material according to claim 1, wherein the carbon material is selected from a group consisting of carbon nanotube, graphene and carbon nanoribbon.

3. The method for fabricating a catalytic 3-dimensional network material according to claim 1, wherein in Step 1A, a weight ratio of the nitrogen-containing carbon material and the aqueous solvent ranges from 0.01:100 to 50:100; a weight ratio of the ammonium carboxymethyl cellulose and the first dispersion liquid ranges from 0.1:100 to 50:100.

4. The method for fabricating a catalytic 3-dimensional network material according to claim 1, wherein a first surfactant is added into the first gel; the first surfactant is sodium dodecyl sulfate (SDS) or sodium dodecyl benzene sulphonate (SDBS).

5. The method for fabricating a catalytic 3-dimensional network material according to claim 4, wherein a weight ratio of the nitrogen-containing carbon material and the aqueous solvent ranges from 0.01:100 to 50:100; a weight ratio of the ammonium carboxymethyl cellulose and the aqueous solvent ranges from 0.1:100 to 80:100; a weight ratio of the first surfactant and the aqueous solvent ranges from 0.01:100 to 50:100.

6. The method for fabricating a catalytic 3-dimensional network material according to claim 1, wherein glycerol is added into the first gel; a weight ratio of the glycerol and the ammonium carboxymethyl cellulose ranges from 0.01:1 to 5:1.

7. The method for fabricating a catalytic 3-dimensional network material according to claim 1, wherein the freeze-drying process is undertaken at a temperature ranging from 0 to −200° C.

8. The method for fabricating a catalytic 3-dimensional network material according to claim 1, wherein the low-temperature heating process is preferably undertaken at a temperature of 80-350° C., for 1 minute to 10 hours.

9. A method for fabricating a catalytic 3-dimensional network material, comprising the steps of:
   Step 1B: mixing a carbon material with an aqueous solvent to form a second dispersion liquid, and mixing the second dispersion liquid with ammonium carboxymethyl cellulose to form a second gel;
   Step 2B: undertaking a freeze-drying process of the second gel to remove water from the second gel to form a second product;
   Step 3B: undertaking a low-temperature heating process of the second product at a temperature of 50-380° C. to cure the second product into a third product; and
   Step 4B: placing the third product in a container filled with ammonium, and keeping the container at a temperature of 500-1000° C. to form a 3D network material doped with nitrogen atoms.

10. The method for fabricating a catalytic 3-dimensional network material according to claim 9, wherein in Step 1B, an acidifying process of the carbon material is used to obtain an acidified carbon material; the acidified carbon material is mixed with the aqueous solvent to form the second dispersion liquid.

11. The method for fabricating a catalytic 3-dimensional network material according to claim 10, wherein a weight ratio of the acidified carbon material and the aqueous solvent ranges from 0.01:100 to 50:100; a weight ratio of the ammonium carboxymethyl cellulose and the aqueous solvent ranges from 0.1:100 to 100:100.

12. The method for fabricating a catalytic 3-dimensional network material according to claim 9, wherein the carbon material is selected from a group consisting of carbon nanotube, graphene and carbon nanoribbon.

13. The method for fabricating a catalytic 3-dimensional network material according to claim 9, wherein in Step 1B, a weight ratio of the carbon material and the aqueous solvent ranges from 0.01:100 to 50:100; a weight ratio of the ammonium carboxymethyl cellulose and the second dispersion liquid ranges from 0.1:100 to 100:100.

14. The method for fabricating a catalytic 3-dimensional network material according to claim 9, wherein a second surfactant is added into the second gel; the second surfactant is sodium dodecyl sulfate (SDS) or sodium dodecyl benzene sulphonate (SDBS).

15. The method for fabricating a catalytic 3-dimensional network material according to claim 14, wherein a weight ratio of the carbon material and the aqueous solvent ranges from 0.01:100 to 50:100; a weight ratio of the ammonium carboxymethyl cellulose and the aqueous solvent ranges from 0.1:100 to 100:100; a weight ratio of the second surfactant and the aqueous solvent ranges from 0.01:100 to 50:100.

16. The method for fabricating a catalytic 3-dimensional network material according to claim 9, wherein glycerol is added into the second gel; a weight ratio of the glycerol and the ammonium carboxymethyl cellulose ranges from 0.01:1 to 5:1.

17. The method for fabricating a catalytic 3-dimensional network material according to claim 9, wherein the freeze-drying process is undertaken at a temperature ranging from 0 to −200° C.

18. The method for fabricating a catalytic 3-dimensional network material according to claim 9, wherein the low-temperature heating process is preferably undertaken at a temperature of 80-350° C., for 1 minute to 10 hours.

* * * * *